US012168303B2

(12) United States Patent
Iwakura et al.

(10) Patent No.: US 12,168,303 B2
(45) Date of Patent: Dec. 17, 2024

(54) ROTARY ELECTRIC SHAVER

(71) Applicant: MAXELL IZUMI CO., LTD., Matsumoto (JP)

(72) Inventors: Kotaro Iwakura, Matsumoto (JP); Koichi Odagiri, Matsumoto (JP); Yuta Sugiura, Matsumoto (JP)

(73) Assignee: MAXELL IZUMI CO., LTD., Matsumoto (JP)

( * ) Notice: Subject to any disclaimer, the term of this patent is extended or adjusted under 35 U.S.C. 154(b) by 246 days.

(21) Appl. No.: 17/897,559

(22) Filed: Aug. 29, 2022

(65) Prior Publication Data

US 2023/0132864 A1 May 4, 2023

(30) Foreign Application Priority Data

Oct. 28, 2021 (JP) ................................ 2021-176037

(51) Int. Cl.
*B26B 19/14* (2006.01)
*B26B 19/38* (2006.01)

(52) U.S. Cl.
CPC .......... *B26B 19/141* (2013.01); *B26B 19/145* (2013.01); *B26B 19/146* (2013.01); *B26B 19/386* (2013.01)

(58) Field of Classification Search
CPC ... B26B 19/141; B26B 19/145; B26B 19/146; B26B 19/386; B26B 19/143; B26B 19/14
USPC .......................................................... 30/43.5
See application file for complete search history.

(56) References Cited

U.S. PATENT DOCUMENTS

| | | | | |
|---|---|---|---|---|
| 2,221,119 A * | 11/1940 | Starr | B26B 19/42 30/34.2 |
| 4,675,998 A | 6/1987 | Thijsse | |
| 5,103,560 A * | 4/1992 | Podolsky | A46B 15/0075 30/535 |
| 5,909,928 A | 6/1999 | Barish | |
| 7,234,239 B2 * | 6/2007 | Saito | B26B 19/40 30/41 |
| 2002/0083591 A1 | 7/2002 | Geertsma et al. | |
| 2006/0064876 A1 * | 3/2006 | Lee | B26B 21/00 30/34.2 |

(Continued)

FOREIGN PATENT DOCUMENTS

| | | |
|---|---|---|
| EP | 0179515 A1 | 4/1986 |
| JP | S61-140767 U | 8/1986 |

(Continued)

OTHER PUBLICATIONS

European Patent Office, "Extended European Search Report for European Patent Application 22193984.6," Mar. 16, 2023.

*Primary Examiner* — Ghassem Alie
(74) *Attorney, Agent, or Firm* — HAUPTMAN HAM, LLP

(57) ABSTRACT

A rotary electric shaver includes a head connected to a blade setting base of a main body. The blade setting base has a setting part in which a plurality of blade units are disposed, and a blade frame that holds the setting part. An inner blade part of the blade unit has an inner blade member, and a base part joined to the inner blade member. An outer blade part of the blade unit has an annular outer blade member having a sliding contact surface and a plurality of slits formed in the circumferential direction, a disk-shaped cover, a ball, and a support. A part of the ball surrounded by the cover and the support protrudes from the cover.

12 Claims, 6 Drawing Sheets

(56) References Cited

U.S. PATENT DOCUMENTS

| | | | | |
|---|---|---|---|---|
| 2006/0150420 | A1 | 7/2006 | Sinnema et al. | |
| 2009/0025234 | A1 * | 1/2009 | Carlucci | B26B 19/042 30/527 |
| 2016/0107324 | A1 * | 4/2016 | Robertson | B26B 21/22 30/53 |
| 2017/0144317 | A1 * | 5/2017 | Shimizu | B26B 19/3893 |
| 2021/0122068 | A1 * | 4/2021 | Ohara | B26B 19/141 |

FOREIGN PATENT DOCUMENTS

| | | | |
|---|---|---|---|
| JP | 2015-070927 | A | 4/2015 |
| WO | 02/45920 | A1 | 6/2002 |
| WO | 2004/108368 | A1 | 12/2004 |

* cited by examiner

ROTARY ELECTRIC SHAVER

CROSS-REFERENCE TO RELATED APPLICATION

This application is based upon and claims the benefit of priority of the prior Japanese Patent Application No. P2021-176037, filed on Oct. 28, 2021, and the entire contents of which are incorporated herein by reference.

TECHNICAL FIELD

The present invention relates to a rotary electric shaver.

BACKGROUND ART

In the related art, with regard to a rotary electric shaver configured to include one blade unit having an outer blade whose outer side has a circular shaving surface and an inner blade which rotates while coming into sliding contact with an inner surface of the outer blade, a configuration has been proposed in which a total of nine balls are fitted into one location on a central axis of the outer blade and eight locations in a circumferential direction on an outer peripheral part of the outer blade so that a part of each of the balls protrudes (PTL 1: JP-UM-A-61-140767). In the related art, a rotary electric shaver having the following configuration is known. A plurality of blade units having an outer blade whose outer side has an annular shaving surface and an inner blade which rotates while coming into sliding contact with an inner surface of the outer blade are disposed (PTL 2: JP-A-2015-070927).

CITATION LIST

Patent Literature

PTL 1: JP-UM-A-61-140767
PTL 2: JP-A-2015-070927

SUMMARY OF INVENTION

Technical Problem

A rotary electric shaver has the following advantage. When a ball is disposed on a contact surface with skin in a head part, the ball comes into contact with the skin so that a user feels a smooth sense of touch on the skin during shaving. However, in the configuration disclosed in PTL 1, a position where a ball receiving member is welded to a minute part of the outer blade is fixed. Consequently, the ball attached to the ball receiving member is likely to be in a biased state. Since the ball is biased, frictional resistance increases, and the ball is brought into a state where the ball is less likely to rotate. In addition, the ball is fitted into the ball receiving member from an outside of the outer blade, thereby causing a possibility that the outer blade may deform depending on adjustment of a fitting force. Furthermore, collision between the inner blade and the ball receiving member needs to be avoided. Accordingly, the inner blade adopts a special shape. In this way, the configuration disclosed in PTL 1 has many manufacturing problems. In the configuration disclosed in PTL 2 in which the plurality of blade units are disposed, compared to the configuration having one blade unit, it becomes more difficult to dispose the ball on the contact surface with the skin in the head part.

Solution to Problem

The present invention is made in view of the above-described circumstances, and an object of the present invention is to provide a rotary electric shaver having the following structure. In a configuration in which a plurality of blade units are disposed, a user feels a smooth sense of touch on skin by disposing a ball in an outer blade part, and an inner blade member can safely rotate so that the ball is likely to rotate.

The present invention has been accomplished under the solutions as disclosed below.

According to the present invention, there is provided a rotary electric shaver including a main body having a grip part and a blade setting base, a motor built in the main body and connected to a first driven shaft, and a head connected to the blade setting base. In the blade setting base, a plurality of second driven shafts are connected to the first driven shaft. The head has a setting part in which a plurality of blade units are disposed, and a blade frame that holds the setting part. Each of the blade units has an outer blade part and an inner blade part. The inner blade part has an inner blade member in which a plurality of blade edges are formed in a circumferential direction, and a base part joined to the inner blade member. The second driven shaft is connected to the base part, and is configured to rotate around an axis passing through the second driven shaft. The outer blade part has an annular outer blade member having a sliding contact surface with which the blade edge comes into sliding contact and having a plurality of slits formed in the circumferential direction, a disk-shaped cover disposed inside the outer blade member, a ball, and a support that supports the ball. The cover has a window having a smaller diameter than the ball. A part of the ball surrounded by the cover and the support protrudes from the window.

According to this configuration, the following configuration can be adopted. A part of the ball supported by the disk-shaped cover disposed at an inner position of an annular part and the support protrudes from the cover, and the ball comes into contact with skin so that a user feels a smooth sense of the touch on the skin during shaving. That is, the ball is supported while the ball is surrounded by the cover and the support. In this manner, while a configuration is adopted so that the inner blade member can safely rotate, a structure can be provided so that the ball is likely to rotate by reducing frictional resistance.

As an example, the number of the balls disposed in each of the outer blades is one or larger. As an example, the number of the balls disposed in each of the outer blades is six or smaller. It is preferable that the number of the balls disposed in each of the outer blade parts is two to six, and all of the balls are disposed at positions deviated from the axis of the second driven shaft. In this manner, a size of the outer blade can be easily reduced to such an extent that the outer blade does not interfere with the second driven shaft. Since the plurality of balls which are small to such an extent that the balls do not interfere with shaving are disposed, a user feels a smoother sense of the touch on the skin.

It is preferable that the support has a ball receiving hole corresponding to the ball on a one-to-one basis and a plurality of claw parts formed at an equal interval in the circumferential direction to protrude from an inner peripheral side of the ball receiving hole, and the claw part is in contact with the ball. In this manner, while the balls are supported from below by the claw parts formed at the equal interval in the circumferential direction, a contact area between the ball and the support can be reduced as much as possible by the claw parts. Accordingly, a structure can be provided so that the ball is more likely to rotate.

It is preferable that in the ball receiving hole, discharge parts are respectively formed on both sides of each of the claw parts. In this manner, even when a shaving waste enters the inside through a gap formed around the ball when the ball is operated in an upward-downward direction, the entering shaving waste passes through the discharge part, passes through the inner blade part, and is collected in a lower shaving waste discharge area. Accordingly, it is possible to prevent accumulation of the shaving waste which hinders an operation of the ball.

As an example, the ball may be made of metal. As an example, both the cover and the support may be made of a resin. The cover may be formed so that a plurality of pins protrude. It is preferable that the support has a plurality of through holes into which the pins are inserted, respectively, and the cover is fitted and assembled to the support. In this manner, the cover and the support can be positioned and fitted to each other. Accordingly, the ball can be easily positioned.

A first projection part may be formed in a center of the base part, and a first hollow part may be formed inside the first projection part. A second projection part may be formed in a center of the support, and the second hollow part may be formed inside the second projection part. It is preferable that the second driven shaft is fitted to the first hollow part, and the first projection part is fitted to the second hollow part. In this manner, the support rotates in conjunction with the second driven shaft while supporting the ball from below. In this manner, the ball rolls. Accordingly, the ball can be positively rotated.

As an example, the number of the disposed blade units is two to six. Three blade units may be disposed in the head. It is preferable that in the setting part, each groove part having a depth which allows swing movement of the blade unit is formed at an intermediate position between the blade unit and the blade unit. In this manner, the three blade units oscillate in accordance with undulations of the skin and come into close contact with the skin. Accordingly, shaving performance can be improved, and an advantageous effect can be expected in that blood circulation is improved by massaging the skin with the ball. It is preferable that the blade setting base is connected to the grip part via a connection part, and the head is capable of tilting with respect to the main body. In this manner, excellent shaving performance is achieved even in a largely undulating area from a chin to a face.

Advantageous Effects of Invention

According to the present invention, it is possible to realize a rotary electric shaver having the following structure. In a configuration in which a plurality of blade units are disposed, a user feels a smooth sense of touch on skin by disposing a ball in an outer blade part, and an inner blade member can safely rotate so that the ball is likely to rotate.

DESCRIPTION OF EMBODIMENTS

Figure 1:
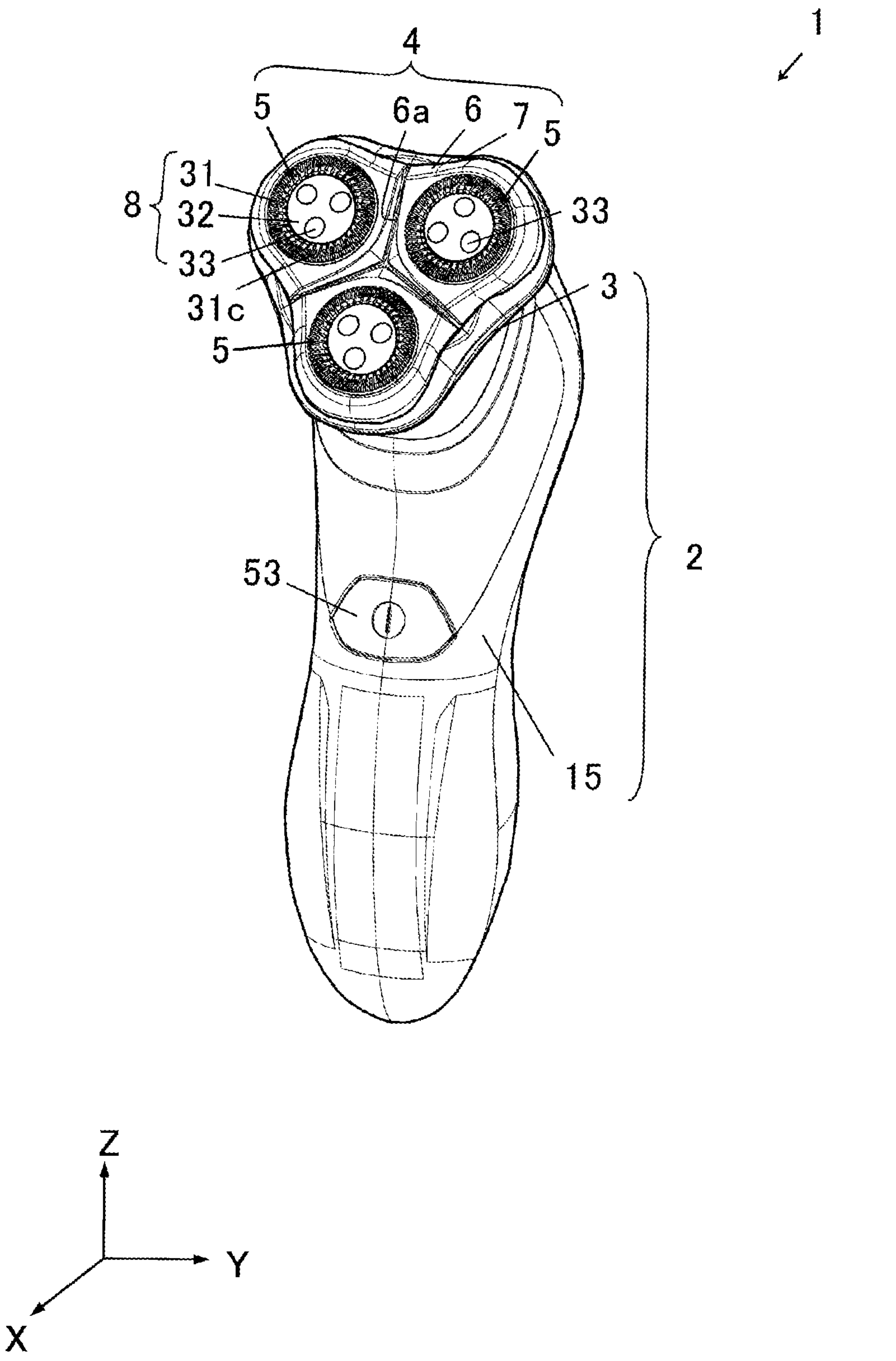
FIG. 1 is a schematic perspective view illustrating an example of a rotary electric shaver according to an embodiment of the present invention.

Hereinafter, an embodiment according to the present invention will be described in detail with reference to the drawings. A rotary electric shaver 1 of the present embodiment has a head 4 having a plurality of blade units 5. As illustrated in FIG. 1, as an example, the rotary electric shaver 1 includes a grip part 15 gripped by a user, and the head 4 detachably connected to a connection part 13 disposed in the grip part 15. A front surface side of a main body 2 is an operation panel, and a power switch 53 is disposed. As an example, a blade setting base 3 is connected to the grip part 15 via the connection part 13, and the head 4 is configured to be capable of tilting with respect to the main body 2. Here, in order to easily describe a positional relationship of each part of the rotary electric shaver 1, directions are indicated by arrows X, Y, and Z in the drawing. When the rotary electric shaver 1 is actually used, without being limited to the directions, the rotary electric shaver 1 may be used in any desired direction. In all drawings for describing the embodiment, the same reference numerals will be assigned to members having the same function, and repeated description thereof may be omitted in some cases.

Figure 2:
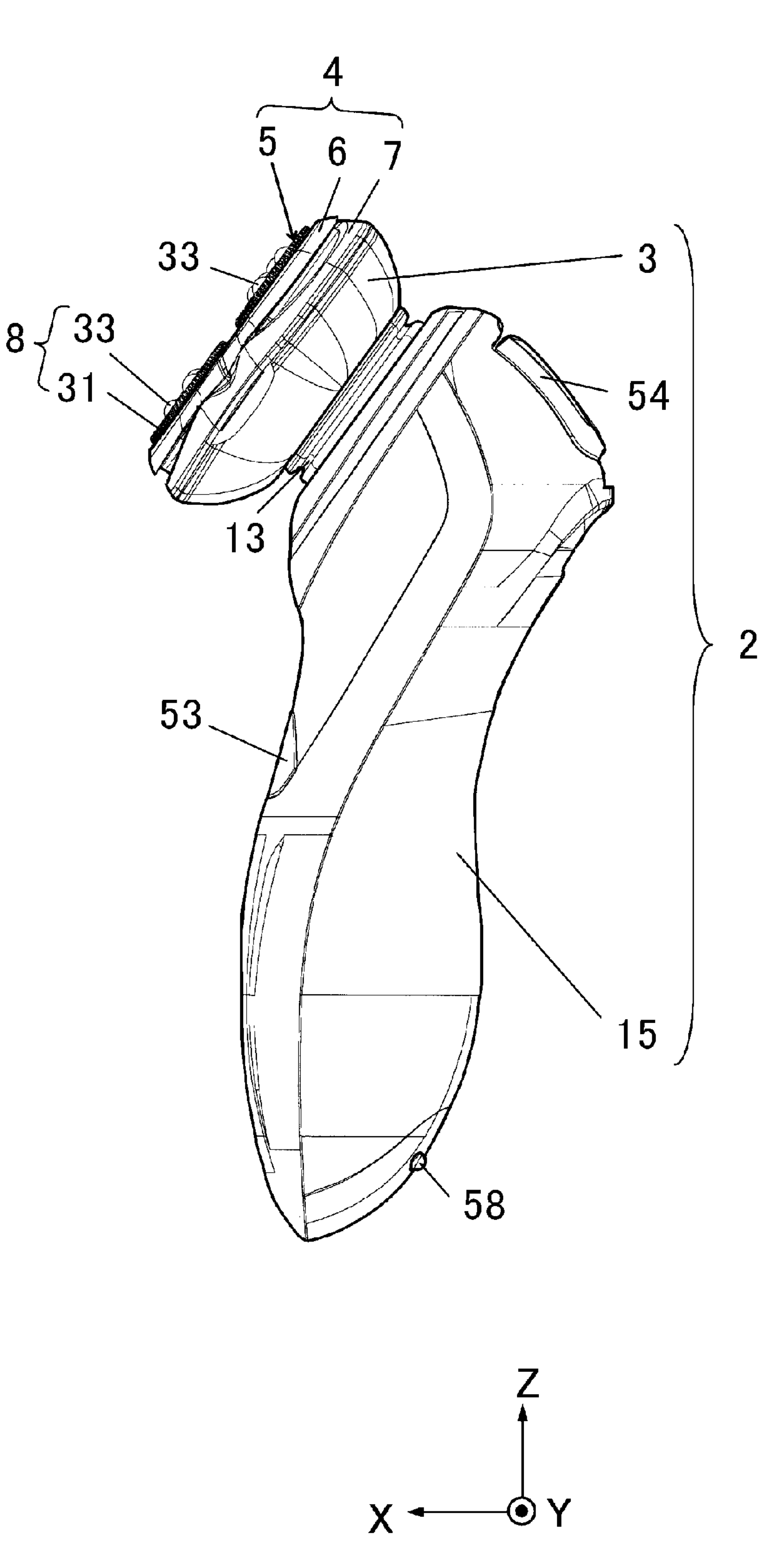
FIG. 2 is a schematic side view of the rotary electric shaver illustrated in FIG. 1.
Figure 3:
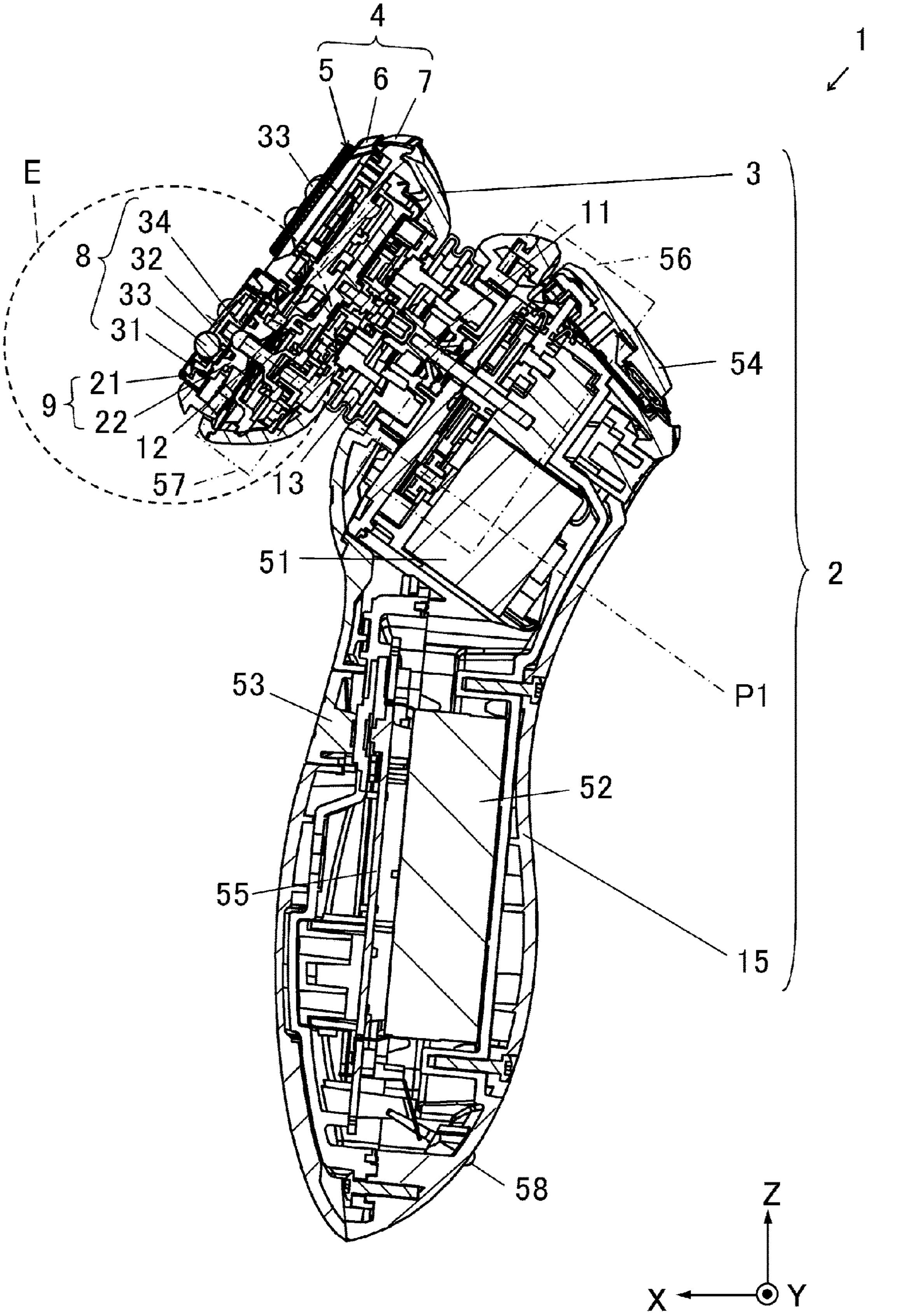
FIG. 3 is a schematic vertical sectional view of the rotary electric shaver illustrated in FIG. 2.

As illustrated in FIGS. 1 to 3, as an example, the main body 2 has the grip part 15 and the blade setting base 3, and a trimmer 54 is disposed on a back surface side of the main body 2. A motor 51, a battery 52 which can supply a direct current to the motor 51, and a controller 55 activated by the power switch 53 are built in the grip part 15 in the main body 2. As an example, a configuration is adopted as follows. A power supply terminal 58 is disposed in a lower part on the back surface side of the main body 2, and power can be supplied to the battery 52 from an external power source via the power supply terminal 58. As an example, the motor 51 is connected to a first driven shaft 11 by a first drive part 56 having a plurality of gears. A technique in the related art can be applied to the first drive part 56. A plurality of second driven shafts 12 are disposed in the blade setting base 3. As an example, three second driven shafts 12 are disposed at a predetermined interval. As an example, the first driven shaft 11 is connected to the second driven shaft 12 by a second drive part 57 having a plurality of gears. A technique in the related art can be applied to the second drive part 57.

The head 4 has a setting part 6 having a plurality of blade units 5, and a blade frame 7 that holds the setting part 6. As an example, three blade units 5 are disposed at a predetermined interval in the head 4. In the setting part 6, each groove part 6*a* having a depth which allows swing movement of the blade unit 5 is formed at an intermediate position between the blade unit 5 and the blade unit 5. In a configuration in which the three blade units 5 are disposed, three groove parts 6*a* are formed, and one end of each of the groove parts 6*a* is connected in a center of the setting part 6. The setting part 6 is configured as follows. The setting part 6 is pressed up due to a restoring force of a plate-shaped spring 41 disposed in the blade frame 7.

Figure 4:
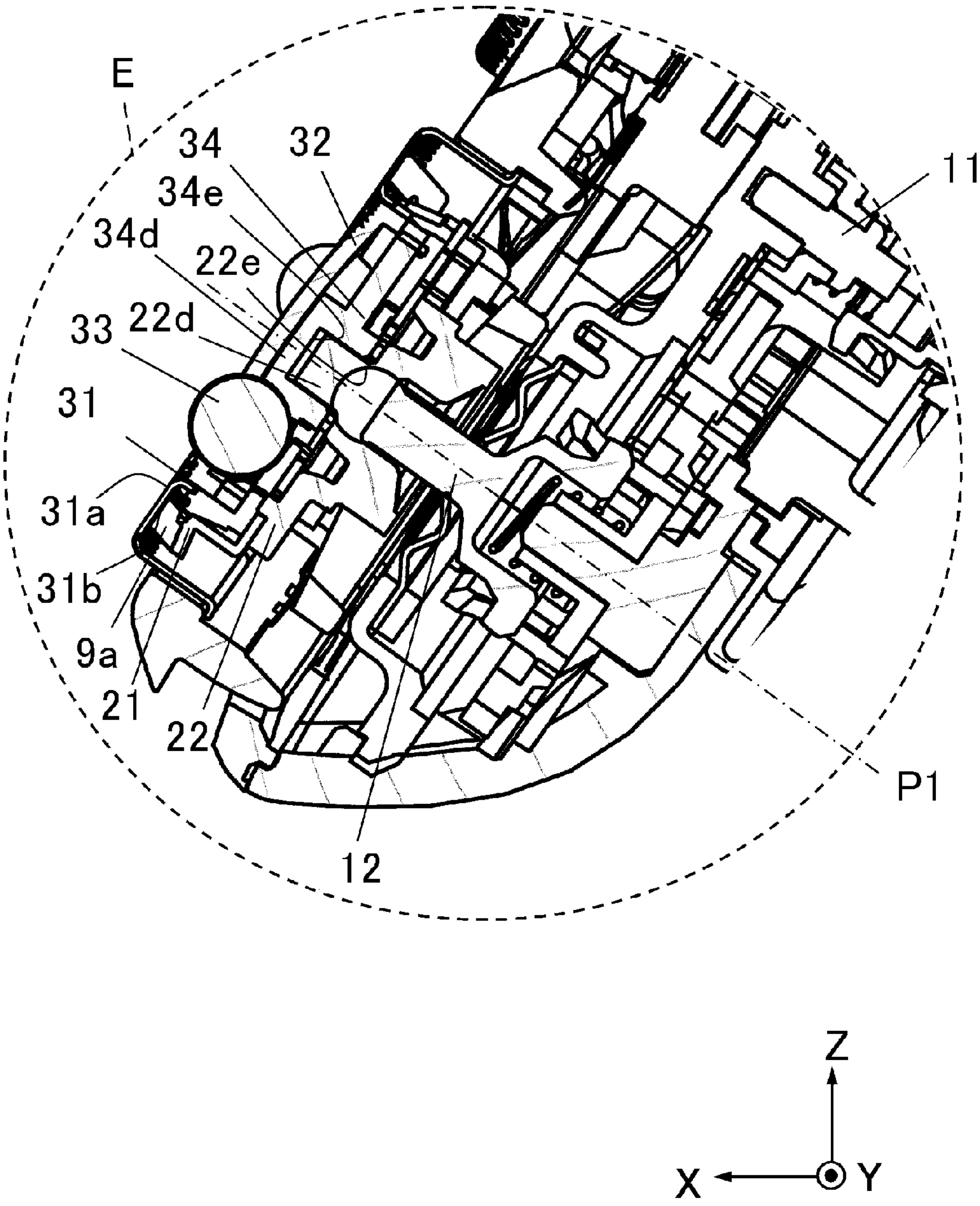
FIG. 4 is an enlarged view of a part surrounded by a broken line in FIG. 3.
Figure 5:
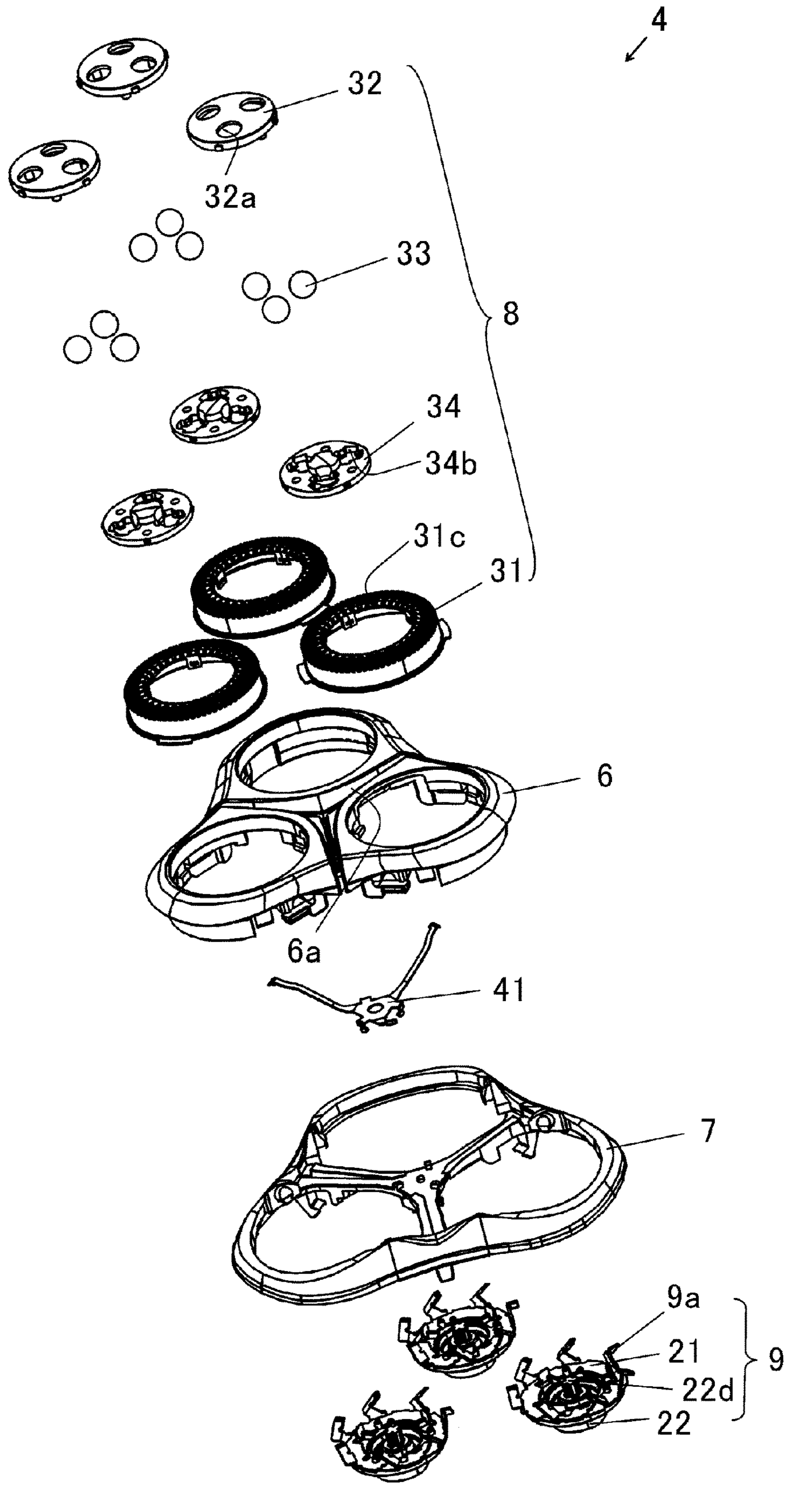
FIG. 5 is a schematic structural development view of a head according to the present embodiment.
Figure 6A:
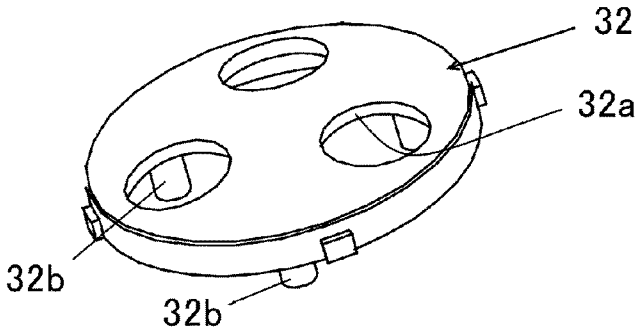
FIG. 6A is a schematic perspective view of a cover.
Figure 6B:
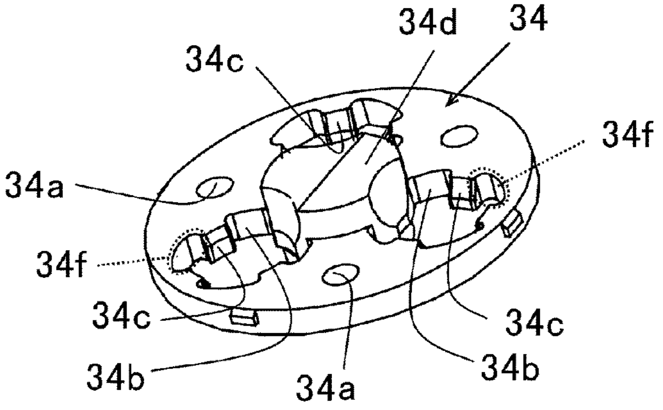
FIG. 6B is a schematic perspective view of a support.
Figure 6C:
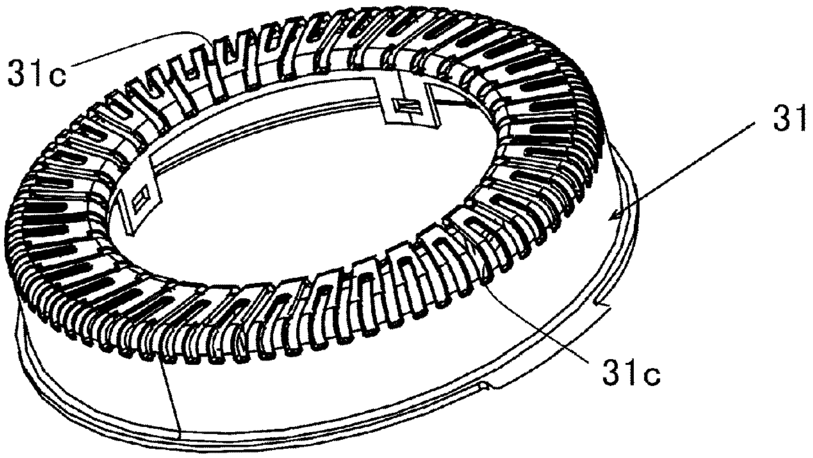
FIG. 6C is a schematic perspective view of an outer blade member.
Figure 6D:
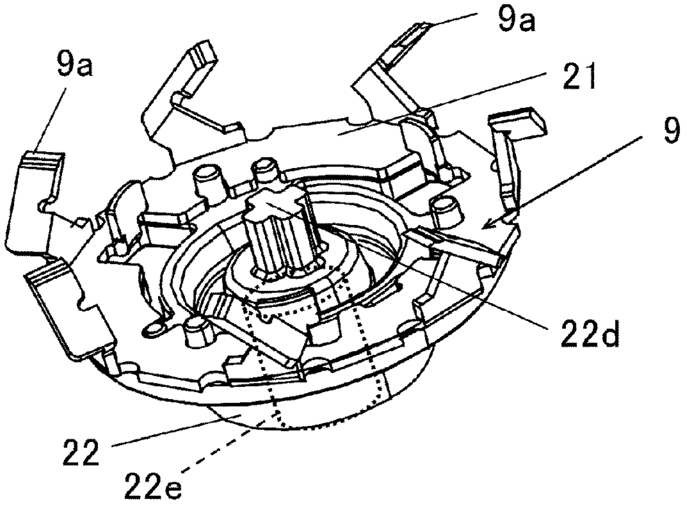
FIG. 6D is a schematic perspective view of an inner blade part.

FIG. 4 is an enlarged view of a part of the head 4 in FIG. 3 which is surrounded by a broken line E. FIG. 5 is a schematic structural development view of the head 4. FIG. 6A is a perspective view of a cover 32 in the head 4. FIG. 6B is a perspective view of a support 34 in the head 4. FIG. 6C is a perspective view of an outer blade member 31 in the head 4. FIG. 6D is a perspective view of an inner blade part 9 in the head 4. An outer blade part 8 is configured to have the annular outer blade member 31, the disk-shaped cover 32, a ball 33, and the support 34.

Each of the blade units 5 has the outer blade part 8 and the inner blade part 9. The outer blade part 8 has an outer shaving surface 31*a* and an inner sliding contact surface 31*b* with which a blade edge 9*a* comes into sliding contact, and has the annular and metal-made outer blade member 31 in which a plurality of slits 31*c* having a size which enables hairs to enter are formed in the circumferential direction. In this invention, examples of the hairs include beards, mustache, whisker, and the like. The inner blade part 9 has a metal-made inner blade member 21 in which a plurality of the blade edges 9*a* are formed in the circumferential direction, and a resin-made base part 22 joined to the inner blade member 21. A first projection part 22*d* is formed in a center of the base part 22, and a first hollow part 22*e* is formed inside the first projection part 22*d*. A tip part of the second driven shaft 12 is fitted to the first hollow part 22*e*, the second driven shaft 12 is connected to the base part 22, and the inner blade member 21 is configured to rotate around an axis P1 of the second driven shaft 12. A technique in the related art can be applied to the outer blade part 8 and the inner blade part 9.

The disk-shaped and resin-made cover 32 is disposed inside the annular outer blade member 31. The cover 32 has a plurality of circular windows 32*a* having a smaller diameter than the ball 33, and has a plurality of pins 32*b* which are formed to protrude.

A plurality of the balls 33 are disposed in each of the outer blade members 31. As an example, three balls 33 are disposed at positions deviated from the axis P1 of the second driven shaft 12. As an example, the ball 33 is made of metal, and is made of stainless steel, aluminum, steel, titanium, a copper alloy, a nickel alloy, or other known metal or alloys. A surface of the ball 33 can be colored by means of plating or by using an anodic oxide film, for example. The ball 33 can be made of a resin or ceramics.

A second projection part 34*d* is formed in the center of the disk-shaped and resin-made support 34, and a plurality of through holes 34*a* into which the pins 32*b* are inserted are formed around the second projection part 34*d*. As an example, the through hole 34*a* is set to have a hole diameter which enables the pin 32*b* to be fitted in a state where the pin 32*b* is inserted into the through hole 34*a*. The support 34 has a ball receiving hole 34*b* corresponding to the ball 33 on a one-to-one basis. The support 34 has a plurality of claw parts 34*c* protruding from an inner peripheral side of the ball receiving hole 34*b* at an equal interval in the circumferential direction. Each of the claw parts 34*c* is in contact with the ball 33 to support the ball 33 from below. As an example, the number of the disposed claw parts 34*c* is three to five. The cover 32 is fitted and assembled to the support 34 in a state where each of the balls 33 is supported from below. A part of the ball 33 surrounded by the cover 32 and the support 34 is configured to protrude from the window 32*a*.

The ball receiving hole 34*b* has discharge parts 34*f* respectively formed on both sides of each of the claw parts 34*c*. In this manner, even when a shaving waste enters the inside through a gap formed around the ball 33 when the ball 33 is operated in an upward-downward direction, the entering shaving waste passes through the discharge part 34*f*, passes through the inner blade part 9, and is collected in a lower shaving waste discharge area. Accordingly, it is possible to prevent accumulation of the shaving waste which hinders an operation of the ball 33. In addition, each of the discharge parts 34*f* has a shape in which a position between the claw parts 34*c* and the claw parts 34*c* which are disposed adjacent to each other in the circumferential direction is enlarged. Accordingly, the claw part 34*c* can have a shape which is likely to follow an operation in the upward-downward direction of the ball 33.

The second projection part 34*d* is formed in the center of the disk-shaped and resin-made support 34, and a second hollow part 34*e* is formed inside the second projection part 34*d*. The first projection part 22*d* is fitted to the second hollow part 34*e*, and the cover 32 and the support 34 are configured to rotate around the axis P1 of the second driven shaft 12 in conjunction with rotation of the inner blade member 21.

According to the present embodiment, the present invention realizes the rotary electric shaver 1 having the following structure. In a configuration in which the plurality of blade units 5 are disposed in the head 4, a user feels a smooth sense of touch on the skin by disposing the ball 33 in the outer blade part 8, and the inner blade member 21 can safely rotate so that the ball 33 is likely to rotate. In addition, the cover 32 and the support 34 rotate while supporting the ball 33. In this manner, the ball 33 rolls. Accordingly, the ball 33 can be positively rotated. The rotary electric shaver 1 achieves excellent shaving performance even in a largely undulating area from a chin to a face.

The present invention is not limited to the embodiment described above, and various modifications can be made within the scope not departing from the present invention.

What is claimed is:

1. A rotary electric shaver, comprising:
- a main body having a grip part and a blade setting base;
- a motor built in the main body and connected to a first driven shaft; and
- a head connected to the blade setting base,
- wherein in the blade setting base, a plurality of second driven shafts are connected to the first driven shaft,
- the head has a setting part in which a plurality of blade units are disposed, and a blade frame that holds the setting part,
- each of the blade units has an outer blade part and an inner blade part,
- the inner blade part has an inner blade member in which a plurality of blade edges are formed in a circumferential direction, and a base part joined to the inner blade member,
- the second driven shaft is connected to the base part, and the inner blade member is configured to rotate around an axis passing through the second driven shaft,
- the outer blade part has an annular outer blade member having a sliding contact surface with which the blade edge comes into sliding contact and having a plurality of slits formed in the circumferential direction, a disk-shaped cover disposed inside the outer blade member, a ball, and a support that supports the ball,
- the cover has a window having a smaller diameter than the ball, and
  - a part of the ball surrounded by the cover and the support protrudes from the window,
- wherein the support has a ball receiving hole corresponding to the ball on a one-to-one basis and a plurality of claw parts formed at an equal interval in the circumferential direction to protrude from an inner peripheral side of the ball receiving hole, and each of the claw parts is in contact with the ball.

2. The rotary electric shaver according to claim 1, wherein in the ball receiving hole, discharge parts are respectively formed on both sides of each of the claw parts.

3. The rotary electric shaver according to claim 1, wherein the ball is made of metal, both the cover and the support are made of a resin, the cover is formed so that a plurality of pins protrude, the support has a plurality of through holes into which the pins are inserted, respectively, and the cover is fitted and assembled to the support.

4. The rotary electric shaver according to claim 1, wherein a first projection part is formed in a center of the base part, and a first hollow part is formed inside the first projection part, a second projection part is formed in a center of the support, and a second hollow part is formed inside the second projection part, and the second driven shaft is fitted to the first hollow part, and the first projection part is fitted to the second hollow part.

5. The rotary electric shaver according to claim 1, wherein three blade units are disposed in the head, and in the setting part, each groove part having a depth which allows swing movement of the blade unit is formed at an intermediate position between the blade unit and the blade unit.

6. The rotary electric shaver according to claim 1, wherein the blade setting base is connected to the grip part via a connection part, and the head is connected to the blade setting base to be capable of tilting with respect to the main body.

7. A rotary electric shaver, comprising:

a main body having a grip part and a blade setting base;

a motor built in the main body and connected to a first driven shaft; and a head connected to the blade setting base, wherein in the blade setting base, a plurality of second driven shafts are connected to the first driven shaft, the head has a setting part in which a plurality of blade units are disposed, and a blade frame that holds the setting part, each of the blade units has an outer blade part and an inner blade part, the inner blade part has an inner blade member in which a plurality of blade edges are formed in a circumferential direction, and a base part joined to the inner blade member, the second driven shaft is connected to the base part, and the inner blade member is configured to rotate around an axis passing through the second driven shaft, the outer blade part has an annular outer blade member having a sliding contact surface with which the blade edge comes into sliding contact and having a plurality of slits formed in the circumferential direction, a disk-shaped cover disposed inside the outer blade member, a ball, and a support that supports the ball, the cover has a window having a smaller diameter than the ball, and a part of the ball surrounded by the cover and the support protrudes from the window, wherein two to six balls are disposed in each of the outer blade parts, all of the balls are disposed at positions deviated from the axis passing through the second driven shaft, and the support has a ball receiving hole corresponding to the ball on a one-to-one basis and a plurality of claw parts formed at an equal interval in the circumferential direction to protrude from an inner peripheral side of the ball receiving hole, and each of the claw parts is in contact with the ball.

8. The rotary electric shaver according to claim 7, wherein in the ball receiving hole, discharge parts are respectively formed on both sides of each of the claw parts.

9. The rotary electric shaver according to claim 7, wherein the ball is made of metal, both the cover and the support are made of a resin, the cover is formed so that a plurality of pins protrude, the support has a plurality of through holes into which the pins are inserted, respectively, and the cover is fitted and assembled to the support.

10. The rotary electric shaver according to claim 7, wherein a first projection part is formed in a center of the base part, and a first hollow part is formed inside the first projection part, a second projection part is formed in a center of the support, and a second hollow part is formed inside the second projection part, and the second driven shaft is fitted to the first hollow part, and the first projection part is fitted to the second hollow part.

11. The rotary electric shaver according to claim 7, wherein three blade units are disposed in the head, and in the setting part, each groove part having a depth which allows swing movement of the blade unit is formed at an intermediate position between the blade unit and the blade unit.

12. The rotary electric shaver according to claim 7, wherein the blade setting base is connected to the grip part via a connection part, and the head is connected to the blade setting base to be capable of tilting with respect to the main body.

* * * * *